United States Patent [19]

Brotz

[11] Patent Number: 4,862,833
[45] Date of Patent: Sep. 5, 1989

[54] ANIMAL TETHER DEVICE

[76] Inventor: Gregory R. Brotz, P.O. Box 1322, Sheboygan, Wis. 53081

[21] Appl. No.: 182,247

[22] Filed: Apr. 15, 1988

[51] Int. Cl.$^4$ ............................................. A01K 3/00
[52] U.S. Cl. .................................................. 119/120
[58] Field of Search ................. 119/29, 117, 118, 119, 119/120

[56]   References Cited
   U.S. PATENT DOCUMENTS

| | | | |
|---|---|---|---|
| 1,563,212 | 11/1925 | Madiar | 119/120 |
| 2,941,657 | 6/1960 | Newcomb et al. | 119/120 |
| 3,189,003 | 6/1965 | Canfield | 119/120 |
| 3,203,399 | 8/1965 | Banks | 119/120 |
| 3,648,664 | 3/1972 | Nunley | 119/120 |
| 3,678,903 | 7/1972 | Ferraro | 119/120 |
| 4,138,966 | 2/1979 | Hensnault | 119/120 X |
| 4,656,967 | 4/1987 | Duksa | 119/120 X |
| 4,667,625 | 5/1987 | Malone | 119/120 |
| 4,791,886 | 12/1988 | Anderson | 119/120 |

FOREIGN PATENT DOCUMENTS 35387 10/1885 Fed. Rep. of Germany ...... 119/120
2060344 5/1981 United Kingdom ................ 119/120

Primary Examiner—Gene Mancene
Assistant Examiner—R. Thomas Price
Attorney, Agent, or Firm—William Nitkin

[57] ABSTRACT

An animal tether device having a plurality of upright post members embedded in the ground interconnected by at least one fence member with a rail member mounted on the post members a distance above the ground, such rail member having a carriage member moveably contained therein with a leash member extending therefrom attached to the animal and fence extension members disposed at each end of said plurality of post members extending from beneath the level of the rail member and curving downward at an angle to the ground to prevent the animal from going around the end posts of the series of posts too sharply so as to prevent tangling of the leash pulling the carriage moving within the rail member.

5 Claims, 3 Drawing Sheets

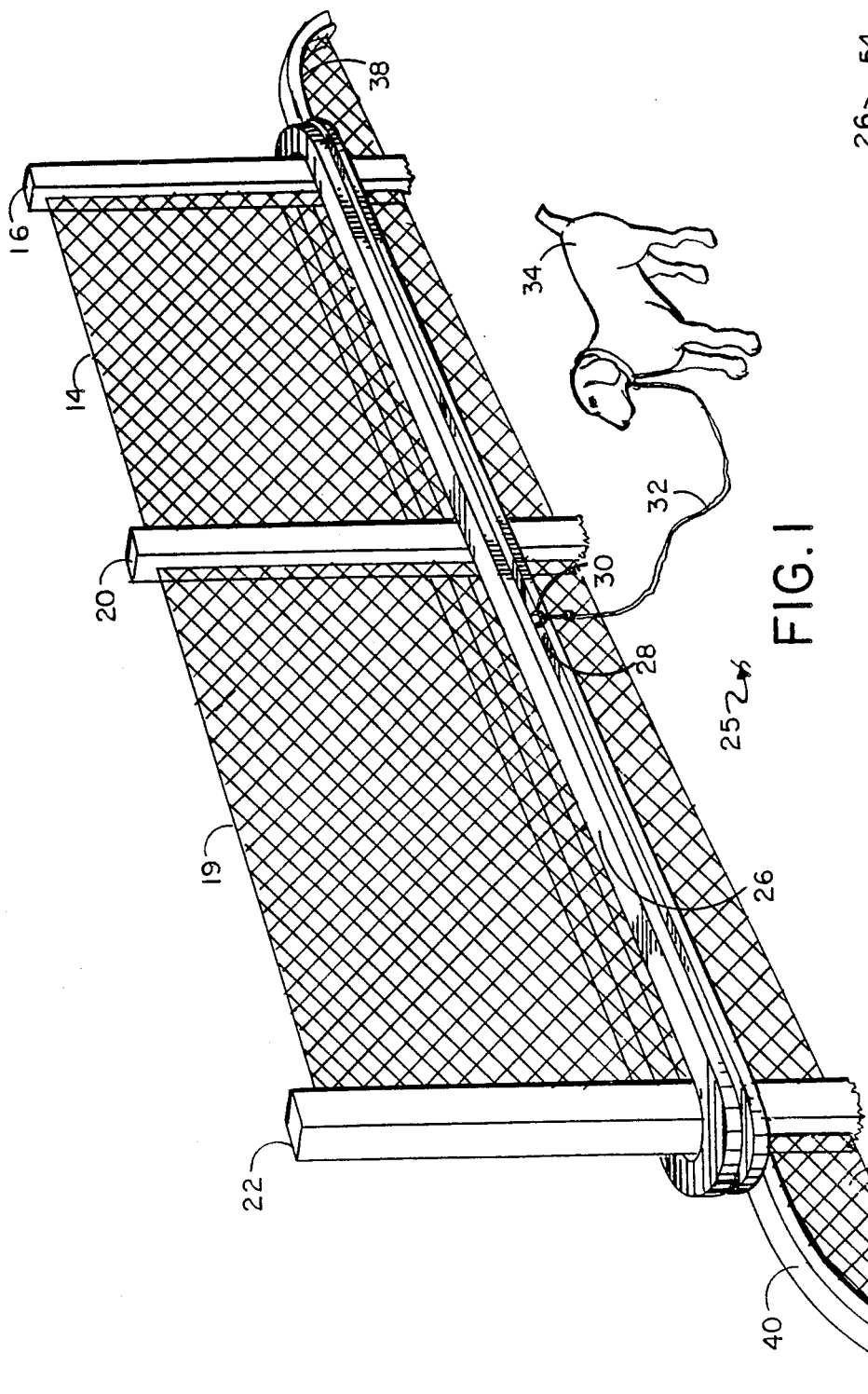

ANIMAL TETHER DEVICE

BACKGROUND OF THE INVENTION

1. Field of the Invention

The device of this invention relates to animal restraining means and more particularly relates to a device which allows movement of the restrained animal but restricting such movement to specific areas.

2. Description of the Prior Art

Animal tether devices are well known in the prior art. A typical device may include a line extended from one pole or tree to another with a pulley attached to such line which pulley runs along the line. An eyebolt is attached to the pulley and the animal's leash is attached to the eyebolt so that the animal can run back and forth attached to the line by the movable pulley within a specific area. Unfortunately many problems have occurred with the pulley-type of device because animals tend to become tangled in line snags and also people can accidentally bump into the line. Efforts have been made such as disclosed in U.S. Pat. No. 1,563,212 to Madiar to prevent tangling by having a suspended cable on which a sleeve moves, such sleeve being attached to a chain running to the animal. The sleeve moves on the cable through eye members mounted on a series of posts, allowing the animal to move around the perimeter of the area to which the cable extends. Problems still may arise with this device. For example, if the animal walks around one of the posts, it would quickly become tangled. The problem of tangling has been addressed in a number of ways in the prior art. Smith in U.S. Pat. No. 3,722,478 discloses a tether assembly which has an extending link in the tether line holding the animal so that if it moves away from the post, the tether extends but yet does not come in contact with the ground. The Smith device still may not prevent tangling around the post itself should the animal run in a direction around the post even though the tether members may be rigid. Others approached the problem by placing the tether rail on or in the ground so as to avoid the use of posts entirely. Three examples of such approaches are seen in U.S. Pat. No. 3,203,399 to Banks; U.S. Pat. No. 3,189,003 to Canfield; and U.S. Pat. No. 3,983,845 to Roehrig. In the Banks device a channel is provided attached to the ground in which channel a carriage, mounted on wheels, moves back and forth along a track as it is pulled by the animal which is tethered thereto by a line 24 attached to a rotatable pivot element affixed on the movable carriage. This patent illustrates several embodiments of carriages and arrangements of wheel members to ride within various track configurations. The Canfield patent cited above also utilizes a channel member attached or embedded in the ground in which a tether member moves being pulled by a line attached to the animal. This device has the advantage of great simplicity in construction. However, the tracks of both the Banks and Canfield inventions can easily become clogged with debris which will curtail their proper operation as they are directly on the ground. Another ground attachment device is disclosed in the Roehrig patent but this device has most of its attachment members affixed to protruding portions of the track so as to avoid the likelihood of track blockage common to ground-mounted prior art devices.

SUMMARY OF THE INVENTION

It is an object of this invention to provide an improved tether for animals such as dogs and the like featuring a new track design and an improved carriage for movement within the channels in the track.

It is a further object of this invention to provide an animal run for a tethered animal which tether will not become tangled and which will allow for great freedom of movement for the tethered animal.

Disclosed in this invention are a series of posts in a row with a rail attached thereto running around both sides of the posts, such rail having a track therein in which a carriage runs and to which carriage is attached the animal's leash. The device of this invention further contains fence members between the posts to prevent the animal from running between or around the posts. The rail extends at a height above the ground around the posts with the fence members therebetween. At the end posts of the fence at a level beneath the rail are lower-level extension fences which have rub rails on the tops thereof which extend curving downward and away from the end posts. These extension fences force the animal to go a distance outward beyond the last post in the post arrangement. This arrangement prevents the animal from going around the end post too quickly and prevents the carriage from catching on the opposite side from where the animal is and becoming jammed in the rail track. The lower-level extension fences require the animal to go quite a distance beyond the last post so that the carriage unit then is at the end of the rail before the animal starts up the other side of the track. In another embodiment the track itself can extend in a loop outward from a central fence post around lateral posts disposed apart from the post line of the fence to further eliminate the possibility of tether-tangling or carriage-jamming at each end post.

The track of this invention can be incorporated in perimeter guard fences utilized, for example, on farms and industrial and military complexes to keep a guard dog at the fence perimeter without human supervisions.

BRIEF DESCRIPTION OF THE DRAWINGS

FIG. 1 illustrates a perspective view of the basic structure of the animal tether of this invention.

FIG. 2 illustrates a top view of an alternate embodiment of this invention showing widened end loops of the track beyond the end post member above the lower fence extension and rub rail.

DESCRIPTION OF THE PREFERRED EMBODIMENT(S)

Figure 3:
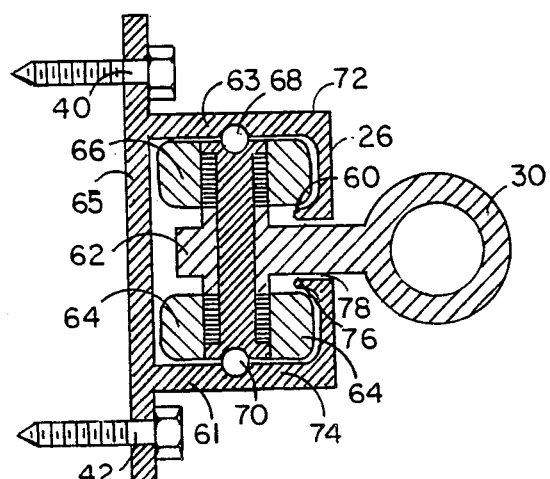
FIG. 3 illustrates an embodiment of a carriage for movement within the track of the rail member of this invention.

FIG. 1 illustrates a perspective view of the device of this invention showing rail 26 extending around on both sides and attached to a series of posts 16, 20 and 22 at a height of a few feet above the ground. Between each of the posts extends a fence such as fence elements 14 and 19 which arrangement prevents animal 34 from passing between the posts and requires that animal 34 such as a dog pull on leash 32, which can be a cable or other equivalent structure, and move carriage 28 within rail 26 laterally so as to allow the dog to move back and forth on the dog run. In this way no tangling can occur because the dog cannot get between the post elements. It is desirable that the fence be high enough to discourage the dog from attempting to jump over it. If the animal does jump over the fence and its leash is too short for it to reach the ground on the other side, it will choke while hanging over the fence. If such a lower fence is used, a longer leash must be provided to prevent any such mishap. This fence can be formed in a variety of positions and angles on the ground whether it runs in curves, straight lines or along irregular lines so as to conform the terrain or the area in which the dog run is to be installed. At first and second end posts 16 and 22 respectively are installed first and second low-level extension fences 36 and 38 which are positioned beneath track rail member 26 and which curve downward to the ground and on the tops of which are affixed rub rails 40. Extension fences 36 and 38 require animal 34 to go, for example, a distance beyond post 22 before it can go to the other side of the run. This additional travel path prevents carriage 28 from becoming jammed at the last post should the animal go around the end post before the carriage has made it around the end post thereby causing the carriage to become caught. By forcing the animal to go to the end of the extension fences before going around end post's cable 32 which is usually attached to eyebolt 30 on carriage 28 can be fully extended the distance of low-level extension fence. Rub rail 40 will prevent the animal from being hurt if it hops over the top of the ends of fence 36 or 38. By causing leash member 32 to be extended as the animal walks to the end of low-level extension fence 36, the carriage goes completely around end post 22 onto the other side of the rail.

FIG. 2 illustrates an alternate embodiment of the device of this invention having many of the features seen in FIG. 1 except that at the positions of end posts 50 and 52 rail track 26 extends in a wide-end loop away from end posts 50 and 52 to which it is attached. The large loop is supported on one side of the fence, for example, by posts 54 and 56 and this larger loop makes it easier for the carriage assembly carrying the eyebolt and attached leash to make it around the end of the fence unit and help prevent tangling. In this way it also helps to prevent tangling. The fence in FIG. 2 is shown with a cutaway section to indicate that it can be of any desired length and does not necessarily have to run in a straight line as shown.

Rails 26 can be bolted to the fence posts by bolts 40 such as seen in FIG. 3. The carriage assemblies have an eyebolt 30 attached to shaft 32 which extends through aperture 78 in rail 26. Rail member 26 has on both sides of aperture 78 lip members 60 and 76 which curve somewhat inward at the opening 78 forming channels. Shaft 30 is attached to carriage 62 which has rotatably attached thereto wheel members 64 and 66 so that it moves easily within the channels formed by the rear of track 65 and front inward curved lip members 60 and 76 which conform to the size of wheels 64 and 66 so that the wheels will rotate easily therein to cause the carriage to be carried in the track as wheels 64 and 66 turn. It should be noted that dual pairs of wheels can be used on one carriage with such wheel pairs coaxially aligned with one another with the second set of wheels on the carriage being similar to the first set. Ball bearings 68 and 70 can be positioned in slots 67 and 71 formed in the ends of axle 69 to cause the carriage member to roll easily on such ball bearings to prevent the sides of the wheels from binding against the upper portion of the tracks 63 and/or the lower portion of the tracks 61.

Figure 4:
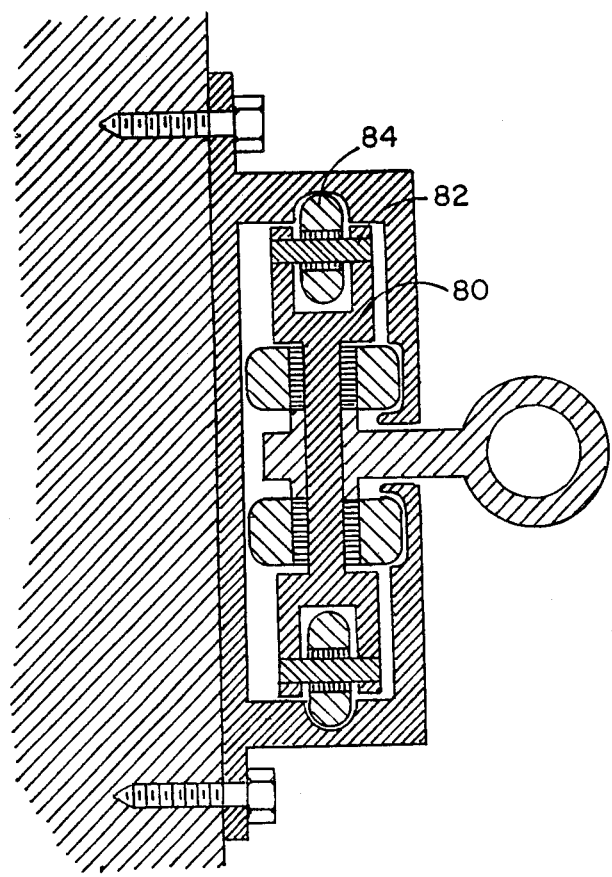
FIG. 4 illustrates a further alternate embodiment of the carriage member.

In the same way in an alternate embodiment as seen in FIG. 4 instead of having ball bearings, the device of the invention can have yoke 80 extending beyond axle 69 on both sides of the carriage. Yoke 80 has shaft 82 on which rotates wheel 84 which is perpendicularly disposed to the original wheels which wheels will cause the carriage to be maintained within track 26 and to rotate and move freely and easily therein. It should be noted that these rail structures and carriage alternatives can be mounted on a wall or other surface.

Figure 5:
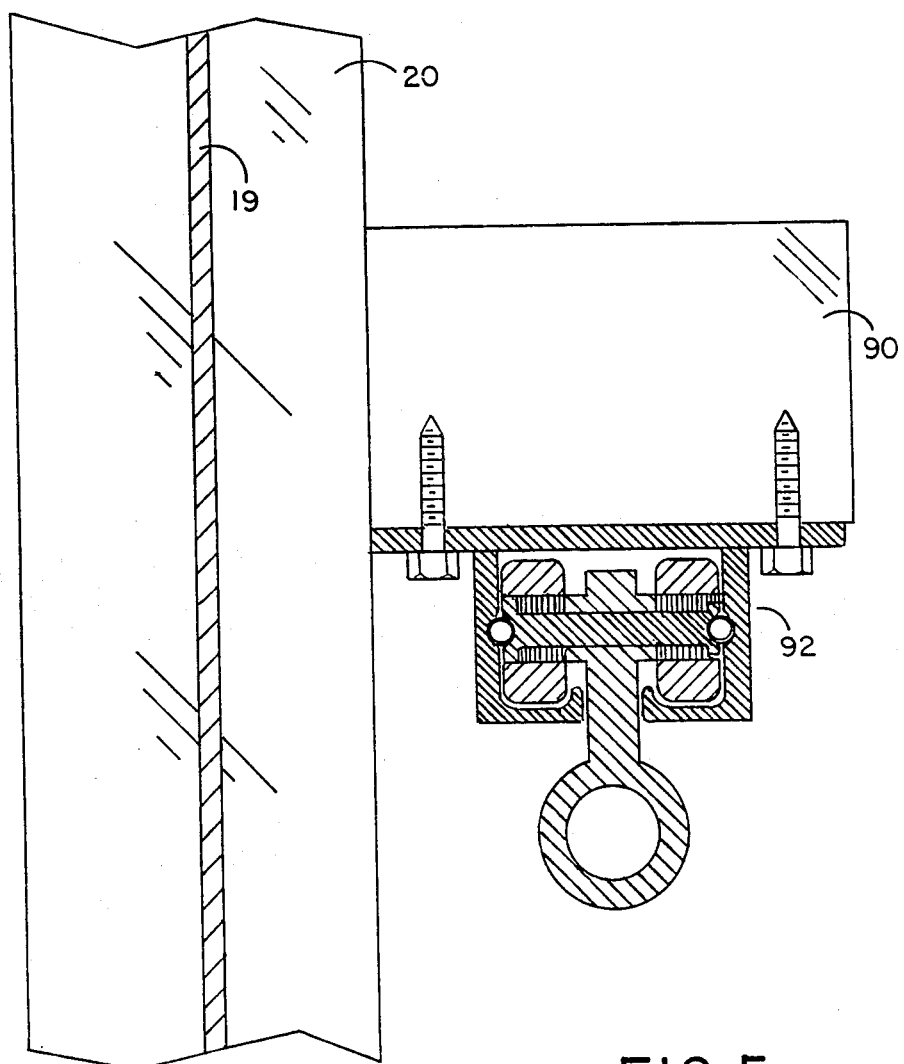
FIG. 5 illustrates an alternate position for the carriage member.

FIG. 5 illustrates carriage 92 mounted on beam 90 attached to fence post 20 so that carriage 92 is facing downward. This embodiment has the advantage of easy movement in the track and is more likely to operate dirtfree since it would be difficult for dirt to move upwards into the carriage mechanism. To reduce carriage movement noise, the track and carriage components can be coated with a friction and noise reducing material such as nylon, teflon or equivalent material.

Although the present invention has been described with reference to particular embodiments, it will be apparent to those skilled in the art that variations and modifications can be substituted therefor without departing from the principles and spirit of the invention.

I claim:

1. An animal tether device comprising:
    a plurality of post members disposed in a series having end posts being the first and last posts of said series of posts, said post members embedded upright in the ground;
    fence members extending between each of said post members;
    a rail member having a carriage receiving track defined therein;
    means for mounting said rail member on said post members a distance above the ground;
    a carriage member movably contained within said carriage receiving track;
    means to attach said carriage member to said animal; and
    lower-level fence extensions, each positioned on an end post at each end of said plurality of post members, said lower-level fence extensions extending from beneath the level of said rail and curving downward at an angle to the ground to prevent the animal from going around the end posts too sharply so as to prevent tangling of the cable pulling said carriage member within said track.

2. The structure of claim 1 further including a rub rail positioned on top of said lower-level fence extension.

3. The structure of claim 1 wherein said rail member extends in a widened loop beyond the end post members.

4. The structure of claim 1 wherein said carriage member includes at least one pair of wheels disposed within channels defined in said rail member with ball bearings disposed at the ends of said carriage member to prevent lateral friction between said carriage member and said rail member.

5. The structure of claim 1 wherein said carriage member includes at least one pair of wheels disposed within channels defined in said rail member with a second pair of wheels mounted perpendicularly to said first pair of wheels on axles within a yoke structure.

* * * * *